United States Patent
Honda et al.

(10) Patent No.: US 8,985,651 B2
(45) Date of Patent: Mar. 24, 2015

(54) VEHICLE-BODY STRUCTURE OF VEHICLE

(71) Applicant: Mazda Motor Corporation, Hiroshima (JP)

(72) Inventors: Masanori Honda, Hiroshima (JP); Kuniyoshi Tashiro, Hiroshima (JP); Shunsuke Kanemoto, Hiroshima (JP); Satoshi Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/062,752

(22) Filed: Oct. 24, 2013

(65) Prior Publication Data

US 2014/0117685 A1    May 1, 2014

(30) Foreign Application Priority Data

Oct. 31, 2012  (JP) ................ 2012-239807

(51) Int. Cl.
  *B60R 19/03*  (2006.01)
  *B60R 19/34*  (2006.01)
  *B60R 19/18*  (2006.01)
(52) U.S. Cl.
  CPC .............. *B60R 19/34* (2013.01); *B60R 19/18* (2013.01); *B60R 2019/1813* (2013.01)
  USPC ...................................................... 293/120
(58) Field of Classification Search
  CPC .. A44B 11/2523; B31F 1/2804; D21H 17/33; D21H 17/46; D21H 17/48; B60R 19/18; B60R 19/34; B60R 2019/1813; B60R 2019/188; B62D 25/084
  USPC .................... 293/12, 102, 117, 122, 132, 133; 296/187.09, 193.09, 203.02
  See application file for complete search history.

(56) References Cited

U.S. PATENT DOCUMENTS

| | | | | |
|---|---|---|---|---|
| 3,933,387 A | * | 1/1976 | Salloum et al. | 293/120 |
| 4,116,480 A | * | 9/1978 | Crestetto | 293/102 |
| 4,361,352 A | * | 11/1982 | Wakamatsu | 293/120 |
| 4,401,332 A | * | 8/1983 | Kimura et al. | 293/135 |
| 5,123,688 A | * | 6/1992 | Takado et al. | 293/120 |
| 5,306,058 A | * | 4/1994 | Sturrus et al. | 293/154 |
| 5,722,708 A | * | 3/1998 | Jonsson | 293/102 |
| 6,065,786 A | * | 5/2000 | Wheatley | 293/109 |
| 6,179,355 B1 | * | 1/2001 | Chou et al. | 293/132 |
| 6,318,775 B1 | * | 11/2001 | Heatherington et al. | 293/120 |
| 6,554,345 B2 | * | 4/2003 | Jonsson | 296/146.6 |
| 6,726,258 B1 | * | 4/2004 | Sundgren et al. | 293/102 |
| 6,886,873 B2 | * | 5/2005 | Weykamp et al. | 293/133 |

(Continued)

FOREIGN PATENT DOCUMENTS

JP   2012-110944 A   6/2012

*Primary Examiner* — Kiran B Patel
(74) *Attorney, Agent, or Firm* — Studebaker & Brackett PC (57) ABSTRACT

A panel member having a U-shaped cross section includes step portions at an upper face portion and a lower face portion, and a distance, in a vehicle longitudinal direction, of the step potions from a panel member formed substantially in a flat-plate shape, is configured such that the distance at a central portion, in the vehicle width direction, of a bumper reinforcement is the maximum and the distance decreases gradually toward an outward direction of the vehicle. Accordingly, the vehicle-body structure which can properly ensure the bending strength and also attain the light weight of the bumper reinforcement, improving the load transmission from the bumper reinforcement to crash cans, can be provided.

9 Claims, 10 Drawing Sheets

(56) References Cited

U.S. PATENT DOCUMENTS

| | | | |
|---|---|---|---|
| 6,971,691 B1* | 12/2005 | Heatherington et al. | 293/102 |
| 6,986,536 B1* | 1/2006 | Heatherington et al. | 293/102 |
| 7,073,831 B2* | 7/2006 | Evans | 293/155 |
| 7,131,674 B2* | 11/2006 | Evans et al. | 293/120 |
| 7,222,897 B2* | 5/2007 | Evans et al. | 293/120 |
| 7,357,430 B2* | 4/2008 | Karlander | 293/102 |
| RE40,736 E* | 6/2009 | Heatherington et al. | 293/102 |
| 7,794,006 B2* | 9/2010 | Karlander | 296/102 |
| 8,087,706 B2* | 1/2012 | Karlander et al. | 293/102 |
| 8,096,595 B2* | 1/2012 | Muskos | 293/120 |
| 8,246,090 B2* | 8/2012 | Loveborn | 293/102 |
| 8,408,632 B2* | 4/2013 | Shimotsu et al. | 296/102 |
| 8,602,183 B2* | 12/2013 | VandenBerge et al. | 188/377 |
| 8,622,446 B2* | 1/2014 | Handing et al. | 293/155 |
| 2004/0036302 A1* | 2/2004 | Shuler et al. | 293/120 |
| 2004/0201255 A1* | 10/2004 | Jonsson | 296/187.03 |
| 2006/0061111 A1* | 3/2006 | Ignafol | 293/102 |
| 2009/0295177 A1* | 12/2009 | Asplund et al. | 293/132 |
| 2010/0127519 A1* | 5/2010 | Wakabayashi et al. | 293/120 |

* cited by examiner

VEHICLE-BODY STRUCTURE OF VEHICLE

BACKGROUND OF THE INVENTION

The present invention relates to a vehicle-body structure of a vehicle equipped with a front bumper reinforcement or a rear bumper reinforcement which has a closed cross section.

In general, the front bumper reinforcement or the rear bumper reinforcement is comprised of a panel member (bumper beam) having a U-shaped cross section and another panel member (closing plate) formed substantially in a flat-plate shape which are jointly fixed together so as to receive an impact load thereat. An article formed in a hat shape which is disclosed in Japanese Patent Laid-Open Publication No. 2012-110944 has been devised as such a front bumper reinforcement or a rear bumper reinforcement in order to improve a resistant force against the impact load.

Figure 10:
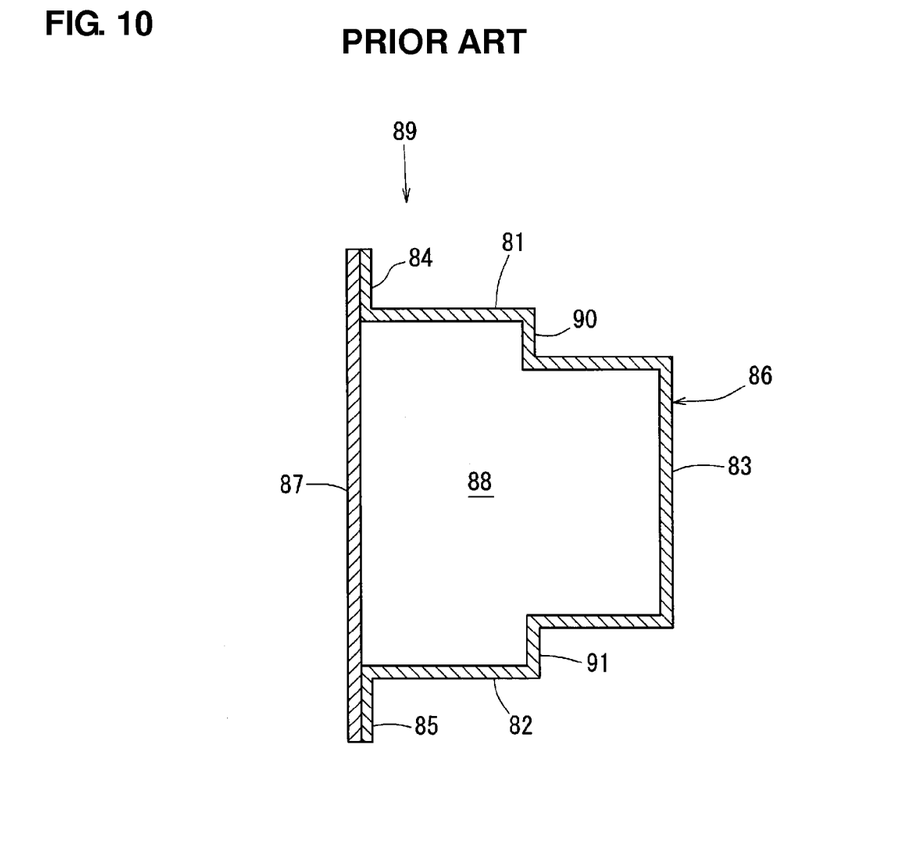
FIG. 10 is a sectional view showing a conventional vehicle-body structure.

That is, as shown in FIG. 10, a bumper reinforcement 89 is formed by a panel member (bumper beam) 86 having a U-shaped cross section and another panel member (closing plate) 87 formed substantially in a flat-plate shape. The panel member 86 includes an upper face portion 81 and a lower face portion 82 which are arranged in parallel to each other with a specified gap therebetween, a vertical wall portion 83 which interconnects respective one-side end portions (i.e., end portions on the side of a vehicle compartment) of the upper face portion 81 and the lower face portion 82, and flange portions 84, 85 which extend vertically outward from respective the other-side end portions (i.e., end portions on the opposite side to the vehicle compartment) of the upper face portion 81 and the lower face portion 82. The panel member 87 is arranged on the opposite side to the vehicle compartment relative to the panel member 86 and joined to the panel member 86 so as to form a closed cross section 88 extending in a vehicle width direction together with the panel member 86. Herein, step portions 90, 91 are respectively formed at the upper face portion 81 and the lower face portion 82 of the above-described panel member 86. That is, the panel member 86 has its crank-shaped step faces formed integrally at its upper-and-lower both faces. Thus, the panel member 86 having the U-shaped cross section which is disclosed in the above-described patent publication includes the step portions 90, 91 formed at its upper-and-lower both face portions 81, 82, so that the resistant force against the impact load can be improved.

In the conventional structure disclosed in the patent document, however, since the cross section shown in FIG. 10 has the same (identical) shape over its whole width in the vehicle width direction, it may be difficult that the bending strength against the impact load can be ensured and also the light weight of the bumper reinforcement can be attained. Further, there may be room for improving the load transmission from the bumper reinforcement to crash cans.

SUMMARY OF THE INVENTION

An object of the present invention is to provide a vehicle-body structure of a vehicle which can properly ensure the bending strength and also attain the light weight of the bumper reinforcement, improving the load transmission from the bumper reinforcement to crash cans.

According to the present invention, there is provided a vehicle-body structure of a vehicle equipped with a bumper reinforcement, the bumper reinforcement comprising a first panel member having a U-shaped cross section, the first panel member including an upper face portion and a lower face portion, a vertical wall portion, and flange portions, and a second panel member formed substantially in a flat-plate shape, the second panel member being arranged on an opposite side to a vehicle compartment relative to the first panel member and joined to the first panel member so as to form a closed cross section extending in a vehicle width direction together with the first panel member, wherein the first panel member includes step portions at the upper face portion and the lower face portion, and a distance, in a vehicle longitudinal direction, of the step potions of the first panel member from the second panel member is configured such that the distance at a central portion, in the vehicle width direction, of the bumper reinforcement is the maximum and the distance decreases gradually toward an outward direction of the vehicle. Herein, the above-described bumper reinforcement may be a front bumper reinforcement or a rear bumper reinforcement. Further, the above-described first panel member having the U-shaped cross section may be a bumper beam, and the above-described second panel member formed substantially in the flat-plate shape may be a closing plate.

According to the present invention, since the distance, in the vehicle longitudinal direction, of the step potions of the first panel member from the second panel member is configured such that the distance at the central portion, in the vehicle width direction, of the bumper reinforcement is the maximum and the distance decreases gradually toward the outward direction of the vehicle, the bending strength of the step portions at the central portion, in the vehicle width direction, of the bumper reinforcement where a bending load occurring in a vehicle light collision is the maximum can be made the maximum, whereas the structure of the step portions at both-side portions of the bumper reinforcement where the above-described bending load is smaller can be made properly light (not heavy). Accordingly, the bending strength can be ensured and also the light weight of the bumper reinforcement can be attained. Additionally, the load transmission from the bumper reinforcement to crash cans can be improved.

According to an embodiment of the present invention, a length (H), in the vehicle longitudinal direction, of the cross section of the bumper reinforcement and the distance (h) of the step potions of the first panel member from the second panel member at the central portion of the bumper reinforcement are configured such that a ratio (h/H) of the distance (h) to the length (H) is 0.2~0.5. Thereby, the bending strength can be further increased. Herein, in a case in which the value of the ratio (h/H) is smaller than 0.2, the weight becomes light but the bending strength decreases. Meanwhile, in a case in which the value of the ratio (h/H) is greater than 0.5, the weight becomes heavy and also the bending strength decreases. Therefore, by setting the value of the ratio (h/H) in the range of 0.2~0.5, the bending strength can be further increased, attaining the light weight of the bumper reinforcement.

According to another embodiment of the present invention, the upper face portion of the first panel member includes a first upper face portion which is located further away from the vertical wall portion and a second upper face portion which is located closer to the vertical wall portion, the lower face portion of the first panel member includes a first lower face portion which is located further away from the vertical wall portion and a second lower face portion which is located closer to the vertical wall portion, and a second angle of the second upper and lower face portions relative to a horizontal direction is configured to be greater than a first angle of the first upper and lower face portions relative to the horizontal direction. Herein, the above-described first or second angle of the first or second upper face portion relative to the horizontal direction means an angle of depression, and the above-described first or second angle of the first or second lower face portion means an angle of ascent. According to the above-described embodiment, since the first angle of the first upper and lower face portions relative to the horizontal direction is relatively small, buckling of the second panel member (closing plate) formed substantially in the flat-plate shape can be prevented properly. Further, since the second angle of the first upper and lower face portions relative to the horizontal direction is relatively great (large), in a case in which the second panel member having the U-shaped cross section is formed through pressing by means of a metal mold, an angle of a corner of the metal mold which is located at the back of the metal mold can be designed so as to be greater (larger), so that the friction against the metal mold can be reduced properly. Consequently, the metal mold can be properly restrained from being worn away. Herein, it is preferable that the first angle of the first upper and lower face portions relative to the horizontal direction be 0~15° and the second angle of the first upper and lower face portions relative to the horizontal direction be 5° or greater (larger).

According to another embodiment of the present invention, flange extension portions which extend toward the vehicle compartment are formed at respective end portions of the flange portions. Thereby, substantially a U-shaped portion is formed at a position in a range from the above-described step portions to the flange extension portions, so that the bending strength against the collision load can be further improved.

According to another embodiment of the present invention, the vehicle-body structure of a vehicle further comprises a pair of front side frames extending in the vehicle longitudinal direction and provided at both sides of the vehicle, and a pair of crash cans provided between front end portions of the front side frames and both-side end portions of the bumper reinforcement, wherein no step portion is formed at the both-side end portions of the bumper reinforcement where the crash cans are provided. Thereby, some sufficient space for welding can be ensured there.

Other features, aspects, and advantages of the present invention will become apparent from the following description which refers to the accompanying drawings.

BRIEF DESCRIPTION OF THE DRAWINGS

FIGS. 7A and 7B show the load transmission at a sectional position taken along line C-C of FIG. 3: FIG. 7A is a sectional view in a normal state; FIG. 7B is a sectional view in a load input state.

DETAILED DESCRIPTION OF THE INVENTION

Figure 1:
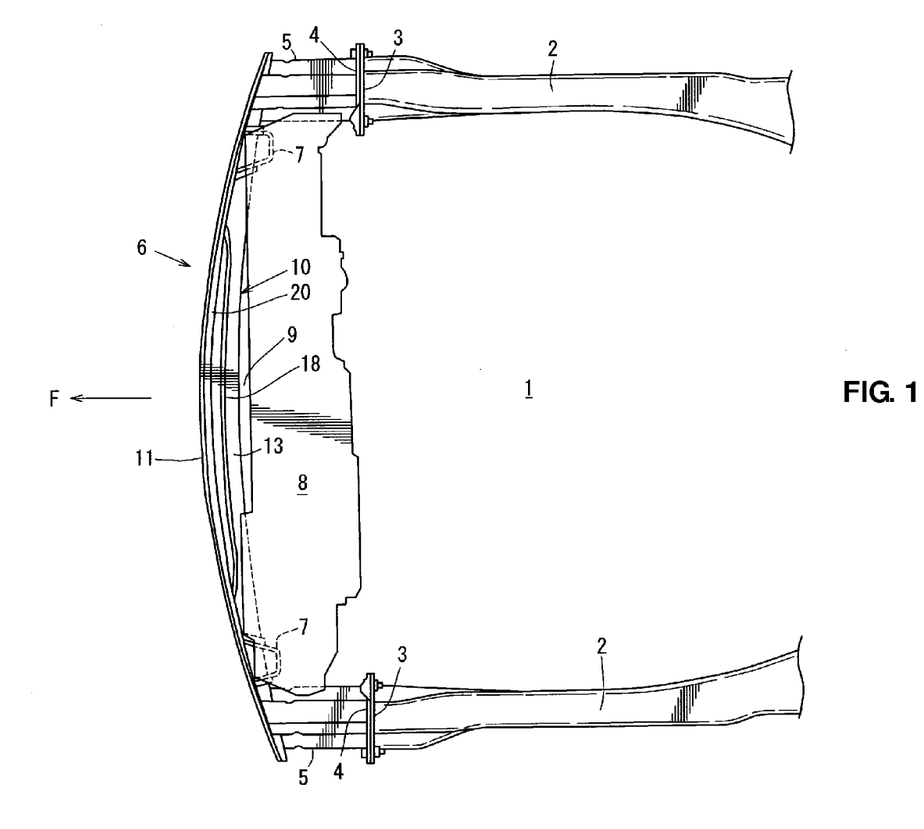
FIG. 1 is a plan view of a vehicle-body structure of a vehicle according to the present invention which is applied to a vehicle front side.
Figure 2:
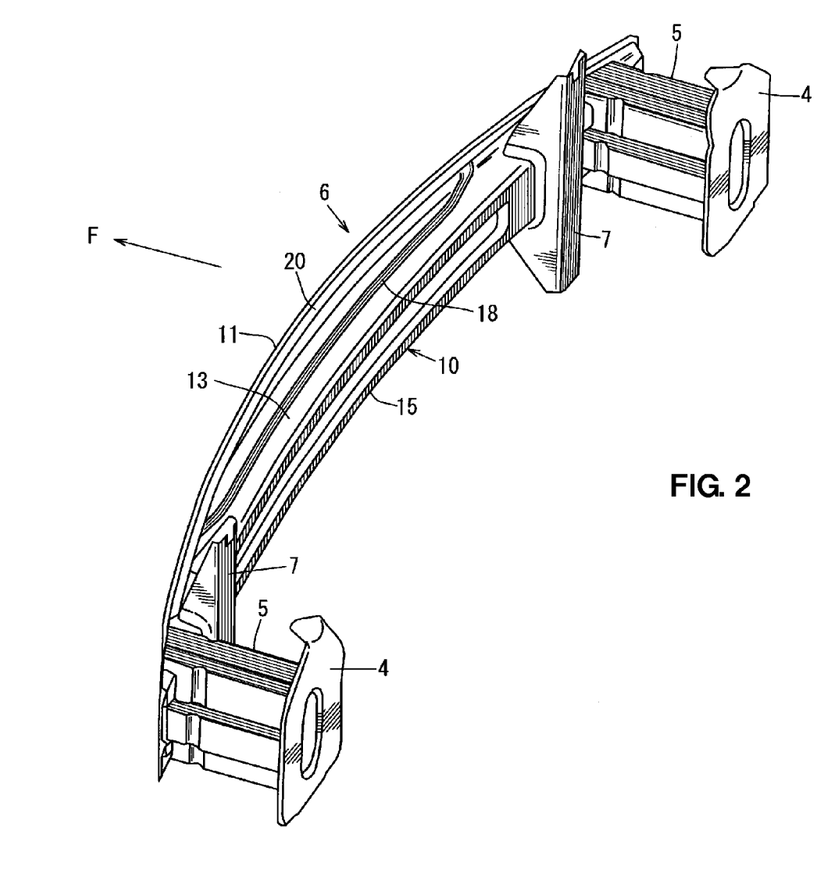
FIG. 2 is a perspective view of a state in which a cooling unit is removed from FIG. 1.
Figure 3:
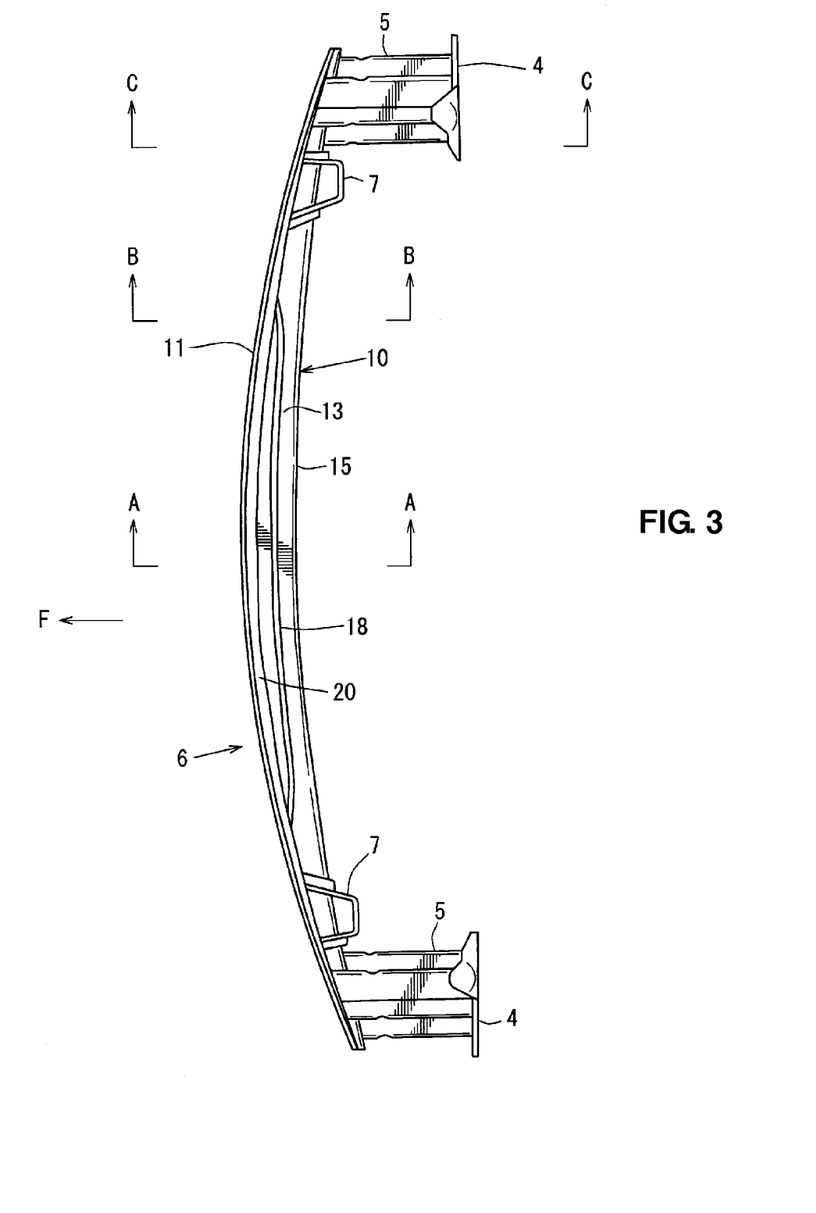
FIG. 3 is a plan view of FIG. 2.

Hereinafter, a preferred embodiment of the present invention will be described specifically referring to the accompanying drawings. The drawings show a vehicle-body structure of a vehicle, and the vehicle-body structure according to the present invention which is applied to a vehicle front side will be described in the following embodiment. FIG. 1 is a plan view of a vehicle-body structure of a front portion of the vehicle, FIG. 2 is a perspective view of a state in which a cooling unit is removed from FIG. 1, and FIG. 3 is a plan view of FIG. 2. In the figures, an arrow F shows a forward direction of the vehicle. In FIGS. 2~3, front side frames 2, 2 which extend in a vehicle longitudinal direction are provided at right-and-left both sides of an engine room 1.

The front side frame 2 is a vehicle-body strength member which has a closed cross section extending in the vehicle longitudinal direction, and its front end portion is formed as a hollow portion which is of a cross shape in an elevation view of the vehicle. A crash can 5 is attached to a front end of the front side frame 2 via a bracket 3 located on the side of the front side frame 2 and a bracket 4 located on the side of the crash can 5.

The crash can 5 is comprised of an inner panel and an outer panel which are combined together, and it is formed as a hollow portion which is of a cross shape in the elevation view of the vehicle so as to correspond to the front end portion of the front side frame 2. A bumper reinforcement 6 is provided to extend in the vehicle width direction between front end portions of the right and left crash cans 5, 5. Brackets 7, 7 for attaching a cooling unit are fixed to specified portions of the bumper reinforcement 6 which are located on the side of the engine room 1 and near inward sides of the right-and-left crash cans 5, 5. Thus, a cooling unit 8 is attached at a front position of the engine room 1, specifically, in front of an engine or a power train installed in the engine room 1 by means of the brackets 7, 7.

As shown in FIG. 1, a gap 9 is formed between a central portion, in the vehicle width direction, of the bumper reinforcement 6 and a central portion, in the vehicle width direction, of the cooling unit 8. Herein, the cooling unit 8 is equipped with a radiator, a cooling fan, a fan cowling and so on.

Figure 4A:
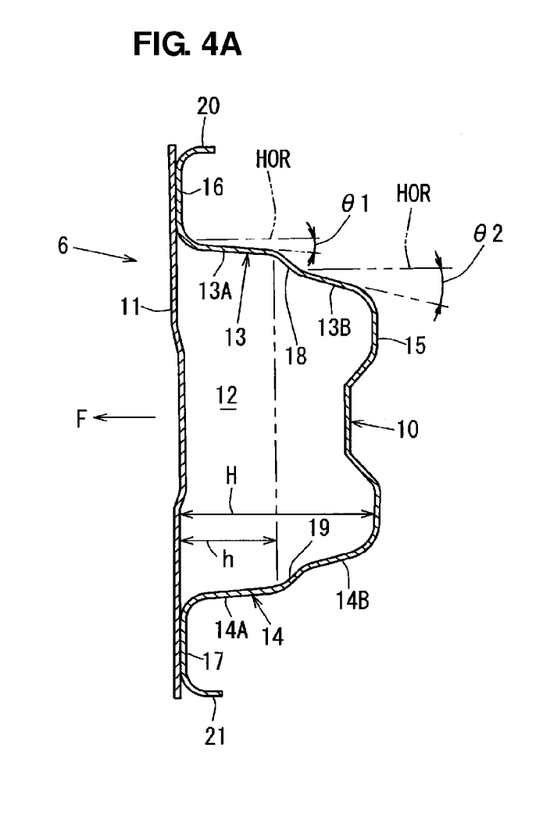
FIG. 4A is a sectional view taken along line A-A of FIG. 3.
Figure 4B:
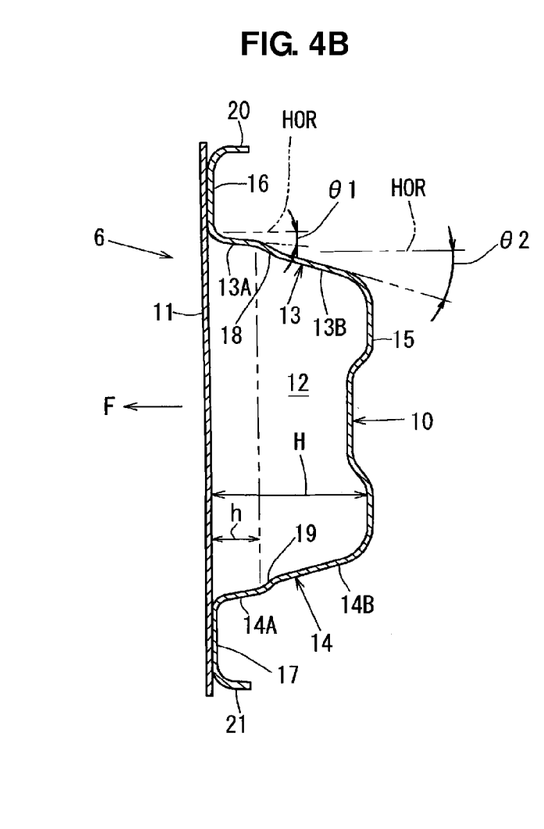
FIG. 4B is a sectional view taken along line B-B of FIG. 3.

FIG. 4A is a sectional view taken along line A-A of FIG. 3, and FIG. 4B is a sectional view taken along line B-B of FIG. 3. As shown in FIGS. 4A and 4B, the bumper reinforcement 6 comprises a bumper beam 10 as a panel member having a U-shaped cross section and a closing plate 11 as a panel member formed substantially in a flat-plate shape. The closing plate 11 is arranged on the opposite side to a vehicle compartment (i.e., on a vehicle forward side) relative to the bumper beam 10 and joined to the bumper beam 10 so as to form a closed cross section 12 extending in the vehicle width direction together with the bumper beam 10. That is, the bumper reinforcement 6 is comprised of the bumper beam 10 and the closing plate 11 which form the closed cross section together.

As shown in FIGS. 4A and 4B, the bumper beam 10 is formed to have a U-shaped cross section by an upper face portion 13 and a lower face portion 14 which face each other with a specified vertical gap therebetween, a vertical wall portion 15 which interconnects respective one-side end portions (i.e., end portions on the side of the vehicle compartment) of the upper face portion 13 and the lower face portion 14, and flange portions 16, 17 which extend vertically outward from respective the other-side end portions (i.e., end portions on the opposite side to the vehicle compartment) of the upper face portion 13 and the lower face portion 14. Further, step portions 18, 19 are respectively formed at the upper face portion 13 and the lower face portion 14 of the bumper beam 10. Herein, the step portion 18 formed at the upper face portion 13 is configured to slant rearward and downward, and the step portion 19 formed at the lower face portion 14 is configured to slant rearward and upward.

Further, as shown in FIGS. 4A and 4B, the upper face portion 13 includes an upper face portion 13B which is located on the side of the vertical wall portion 15 relative to the step portion 18 and an upper face portion 13A which is located on the opposite side to the vertical wall portion 15 relative to the step portion 18. Likewise, the lower face portion 14 includes a lower face portion 14B which is located on the side of the vertical wall portion 15 relative to the step portion 19 and a lower face portion 14A which is located on the opposite side to the vertical wall portion 15 relative to the step portion 19. An angle θ2 of the upper face portion 13B or the lower face portion 14B which is located on the side of the vertical wall portion 15 relative to a horizontal direction HOR is configured to be greater (larger) than an angle θ1 of the upper face portion 13A or the lower face portion 14A which is located on the opposite side to the vertical wall portion 15 relative to the horizontal direction HOR. That is, a relationship of θ2>θ1 is satisfied. In other words, the angle θ1 of the upper or lower face portions 13A, 14A located on the opposite side to the vertical wall portion 15 relative to the horizontal direction HOR is configured to be smaller than the angle θ2 of the upper or lower face portions 13B, 14B located on the side of the vertical wall portion 15 relative to the horizontal direction HOR.

In the present embodiment, the above-described angle θ1 is set to be 0~15°, so that an angle of the upper or lower face portions 13B, 14B located on the opposite side to the vertical wall portion 15 relative to the closing plate 11 can be as close to the right angle as possible so as to prevent the closing plate 11 from having buckling. Moreover, the above-described angle θ2 is set to be 5° or greater (larger), so that in a case in which the bumper beam 10 is formed through pressing by means of a metal mold, an angle of a corner of the metal mold which is located at the back of the metal mold can be designed to be as great (large) as possible. Thereby, the friction against the metal mold is reduced, so that the metal mold can be restrained from being worn away properly.

In the present embodiment, as shown in FIGS. 4A and 4B, the upper face portion 13A and the lower face portion 14A which are located on the opposite side to the vertical wall portion 15 are formed in unparallel to each other and also the upper face portion 13B and the lower face portion 14B which are located on the side of the vertical wall portion 15 are formed in unparallel to each other. Further, as shown in FIGS. 4A and 4B, a flange extension portion 20 which extends toward the vehicle compartment is formed at an upper end portion of the above-described upper-side flange portion 16. Likewise, a flange extension portion 21 which extends toward the vehicle compartment is formed at a lower end portion of the above-described lower-side flange portion 17. Thereby, substantially a U-shaped portion is formed at a position in a range from the step portions 18, 19 to the flange extension portions 20, 21, so that the bending strength against the collision load can be further improved.

Each of respective portions between the element 16 and the element 13A, the element 13A and the element 18, the element 18 and the element 13B, the element 13B and the element 15, and the element 17 and the element 14A, the element 14A and the element 19, the element 19 and the element 14B, the element 14B and the element 15 is formed by an arc connecting portion, not by an right-angle connecting portion, so that any portion which causes buckling of the bumper beam 10 may not be provided. Moreover, as shown in FIGS. 3, 4A and 4B, a distance h, in the vehicle longitudinal direction, of the step potions 18, 19 of the bumper beam 10 from the closing plate 11 is configured such that the distance h at the central portion, in the vehicle width direction, of the bumper reinforcement 6 is the maximum and the distance h decreases gradually toward the outward direction of the vehicle.

As shown in FIGS. 4A and 4B, a length H, in the vehicle longitudinal direction, of the bumper reinforcement 6 and the above-described distance h of the step potions 18, 19 of the bumper beam 10 from the closing plate 11 at the central portion of the bumper reinforcement 6 are configured such that a ratio h/H of the distance h to the length H is 0.2~0.5, preferably 0.3~0.45. Meanwhile, no step portion is formed at the both-side end portions of the bumper reinforcement 6 where the bracket for attaching the cooling units 7 and the crash cans 5 are provided as shown in FIG. 3.

Particularly, since no step portion is formed at the end portions of the bumper reinforcement 6 where the crash cans 5 are provided, some sufficient space for welding can be ensured there. That is, the crash cans 5 are fixed by welding to the bumper beam 10, and therefore if some step portion exited at this connection portion of the bumper beam 10, it would be necessary to provide the crash cans with some area for corresponding to this step portion of the bumper beam 10, so that it could be difficult to ensure some sufficient space for welding at the crash cans. The above-described range of the ratio h/H has been obtained through many try-and-errors by experiments, and hereinafter, this point will be described referring to FIGS. 5 and 6.

Figure 5:
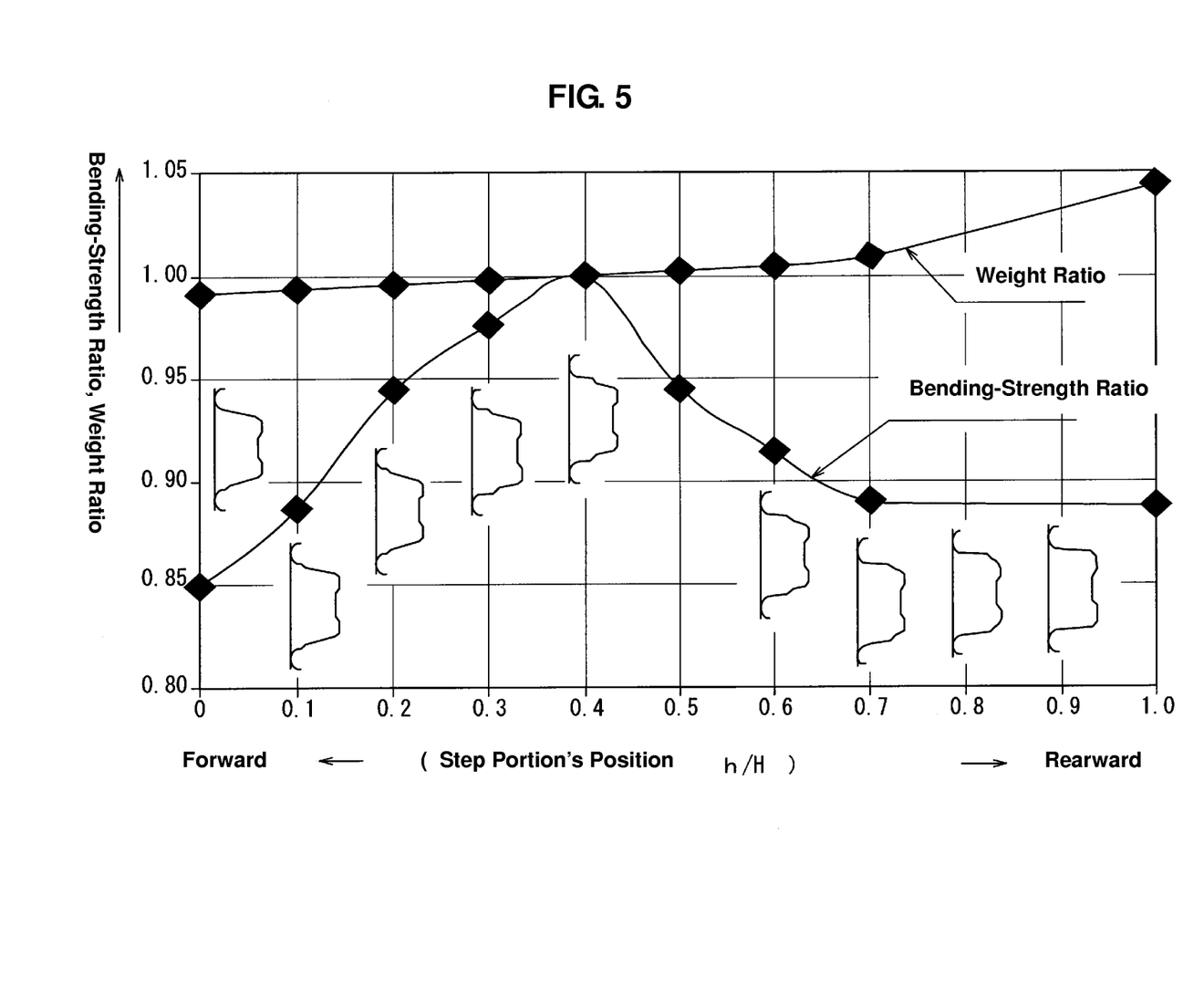
FIG. 5 is a characteristic diagram showing a bending strength ratio and a weight ratio for a position of a step portion.
Figure 6:
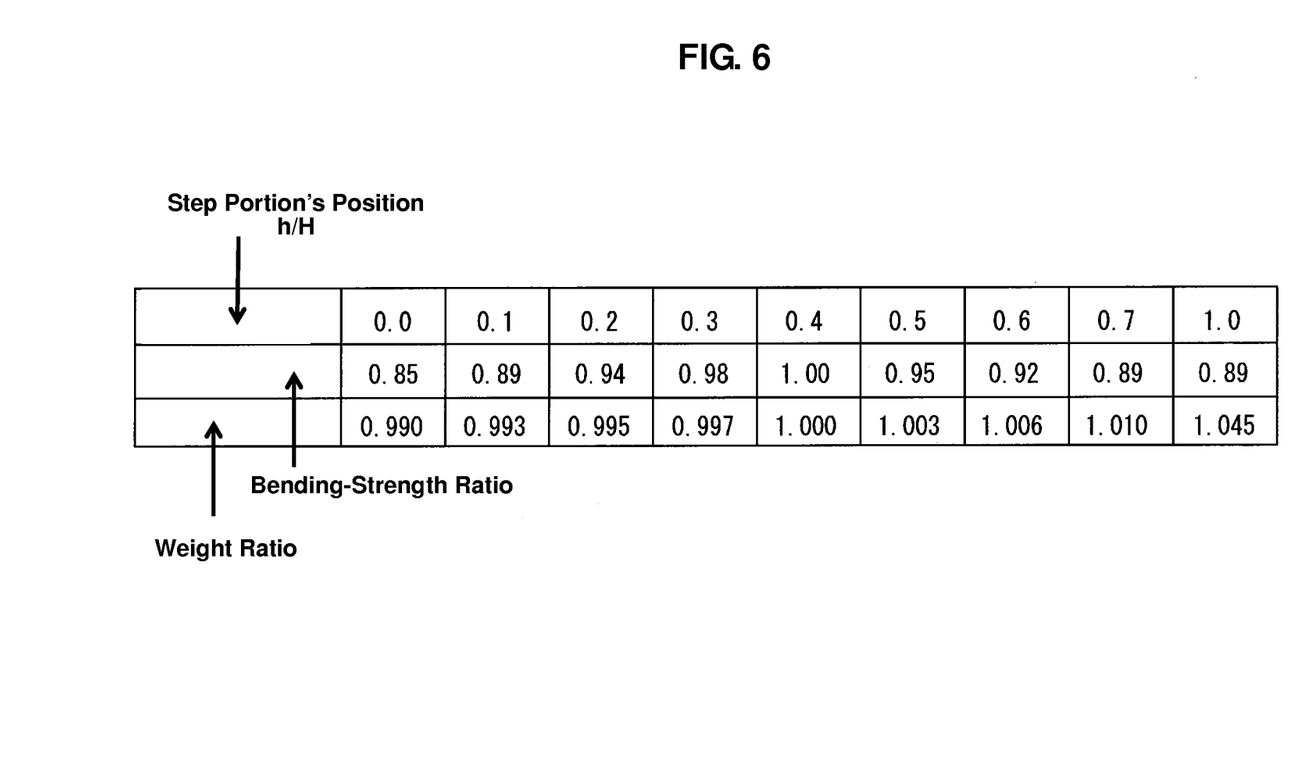
FIG. 6 is an explanatory diagram showing the bending strength ratio and the weight ratio for the position of the step portion.

FIG. 5 is a characteristic diagram showing a bending strength ratio and a weight ratio (the axis of ordinates) for the ratio h/H (the axis of abscissas), wherein the magnitude of the bending strength ratio and the weight ratio were set at "1.0" when the ratio h/H was 0.4. Further, FIG. 6 is an explanatory diagram showing contents of FIG. 5 by numerical expressions.

In fact, some types of bumper reinforcements having the ratio h/H of 0.0, 0.1, 0.2, 0.3, 0.4, 0.5, 0.6, 0.7 and 1.0 were manufactured, and each of the weight ratios of these bumper reinforcements was obtained from an actually-measured weight of these bumper reinforcements, wherein the magnitude of the weight ratio was set at "1.0" when the ratio h/H was 0.4. Likewise, each of the bending strengths of these bumper reinforcements was obtained from an actually-measured bending strength of these bumper reinforcements, wherein the magnitude of the bending strength ratio was set at "1.0" when the ratio h/H was 0.4.

It was found regarding the bending strength that the magnitude of the bending strength ratio was considerably high in the range 0.2~0.5 (preferably in the range 0.3~0.45) and became the maximum at the h/H of 0.4. Meanwhile, it was found regarding the weight that the magnitude of the weight ratio increased gradually (became heavier) as the step portions 18, 19 approach toward the vertical wall portion 15 (i.e., vehicle rearward). In other wards, the magnitude of the weight ratio decreased gradually (became lighter) as the step portions 18, 19 go further away from the vertical wall portion 15 (i.e., vehicle forward).

That is, when the value of the ratio h/H at the central portion, in the vehicle width direction, of the bumper reinforcement 6 was smaller than 0.2, the weight became light but the bending strength decreased. When the value of h/H at the central portion, in the vehicle width direction, of the bumper reinforcement 6 was greater than 0.5, the weight became heavy and also the bending strength decreased. Thus, by setting the value of the ratio h/H in the range 0.2~0.5, preferably in the range 0.3~0.45, it was found that the bending strength can be further increased, attaining the light weight of the bumper reinforcement 6.

Figure 7A:
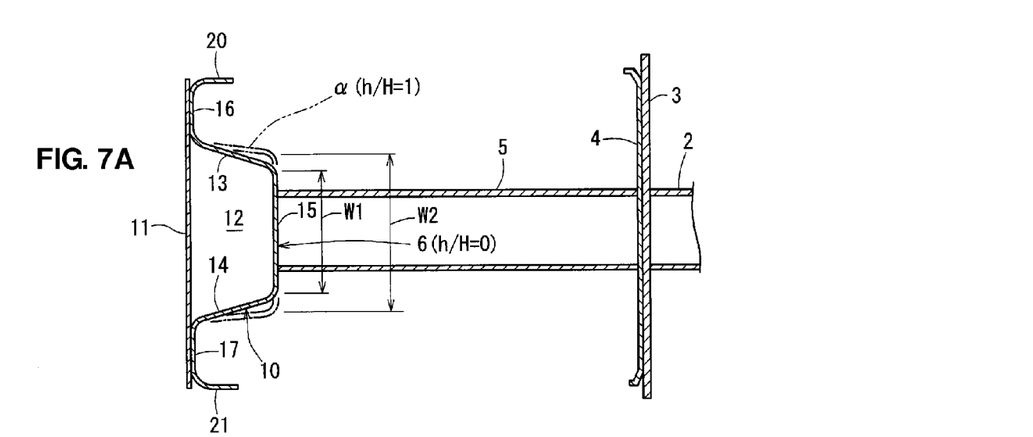
Figure 7B:
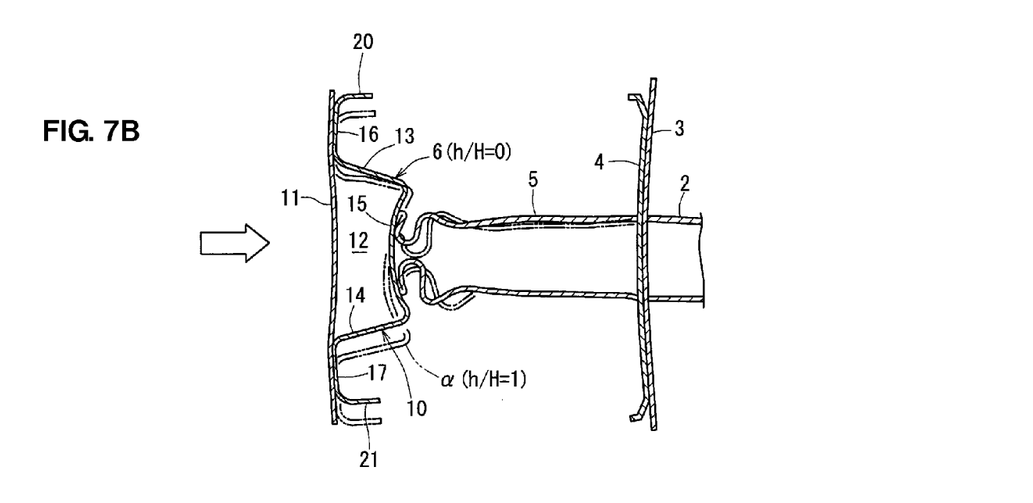

FIGS. 7A and 7B are sectional views taken along line C-C of FIG. 3, which show the load transmission from the bumper reinforcement 6 to the crash can 5, comparing the present embodiment's sample illustrated by a solid line and a comparative sample α illustrated by an imaginary line. FIG. 7B shows respective sectional deformations of the present embodiment's sample and the comparative sample a when a barrier collided with the both under the same conditions, wherein the value of the ratio h/H at the line C-C sectional position of the present embodiment's sample was set at "0" and the value of the ratio h/H of the comparative sample a was set at "1".

As apparent from comparison of the solid lines and the imaginary lines in FIG. 7B, the present embodiment's sample having the ratio h/H=0 illustrated by the solid lines provided the feature that the sectional deformation was small and the load can be easily transmitted to the crash can 5, but the comparative sample having the ratio h/H=1 illustrated by the imaginary lines provided the feature that the sectional deformation was large and the load cannot be easily transmitted to the crash can 5. That is, the shape of the closed cross section 12 became a trapezoid at a joint face portion (see the vertical wall portion 15) of the bumper reinforcement 6 to the crash can 5, so that a vertical width W1 of the vertical wall portion 15 of the present embodiment's sample having the ratio h/H=0 and the narrower cross section of the bumper reinforcement was smaller than a vertical width W2 of the comparative sample (h/H=1) (the shape of the closed cross section 12 became substantially a square). Accordingly, the rigidity of the joint face portion increased, so that the load can be easily transmitted to the crash can 5.

This means that the structure in which the step portions 18, 19 are located further away from the vehicle compartment (i.e., forward) such that the angle of the upper face portion 13 and the lower face portion 14 is primarily comprised of the angle θ2 is superior in the load transmission from the bumper reinforcement 6 to the crash can 5, compared with the structure in which the step portions 18, 19 are located closer to the vehicle compartment (i.e., rearward) such that the angle of the upper face portion 13 and the lower face portion 14 is primarily comprised of the angle θ1. In other words, the smaller (shorter) vertical width W2, W1 of the vertical wall portion 15 can provide the more appropriate load transmission from the bumper reinforcement 6 to the crash can 5. The structure in which the distance h of the step potions 18, 19 from the closing plate 11 is configured such that the distance at the central portion, in the vehicle width direction, of the bumper reinforcement 6 is the maximum and the distance decreases gradually toward the outward direction of the vehicle means that according to the present embodiment in which the present invention is applied to the front side of the vehicle body, the step portions 18, 19 are formed to be located forward gradually as they are positioned toward the outward direction of the vehicle from the central portion, in the vehicle width direction, of the bumper reinforcement 6. Thereby, the load transmission from the bumper reinforcement 6 to the crash can 5 can be appropriate.

Figure 8:
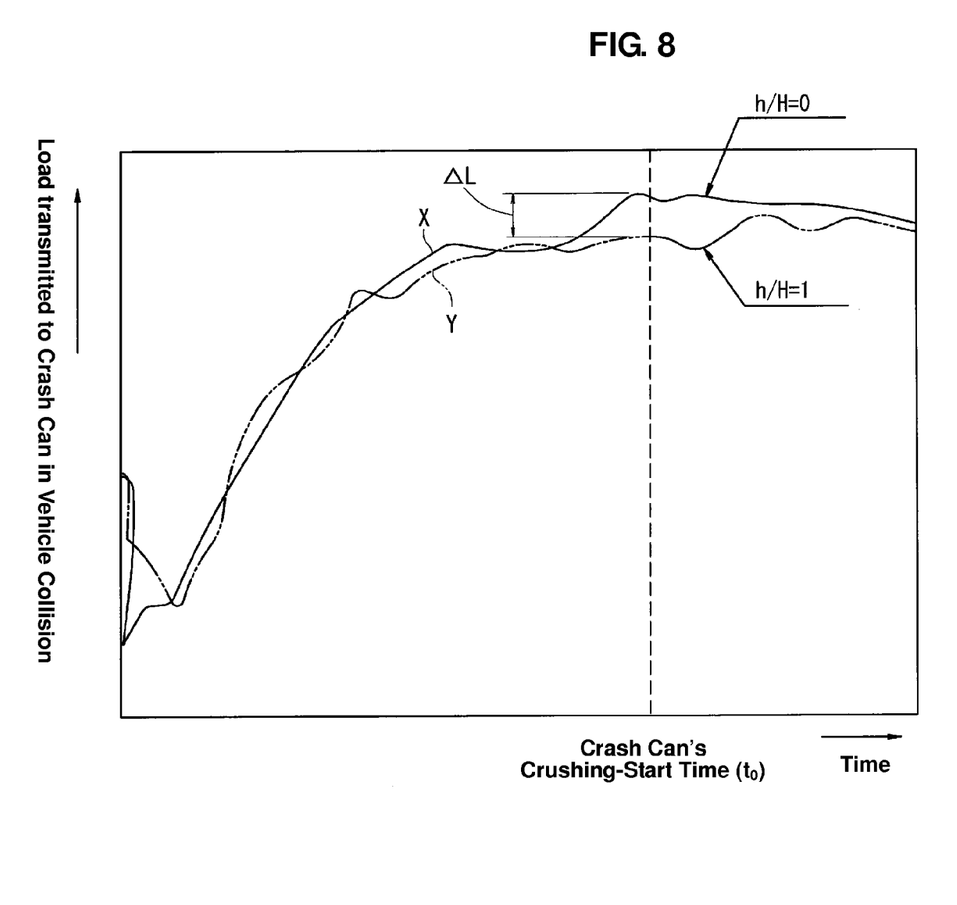
FIG. 8 is a characteristic diagram showing a change of a load transmitted to a crash can in a vehicle collision.

FIG. 8 is a characteristic diagram showing a change of the load transmitted to the crash can in the collision, which shows the characteristic of the present embodiment's sample (h/H=0) by a solid line X and the characteristic of the comparative sample (h/H=1) by an imaginary line Y. In FIG. 6, the axis of abscissas presents the time, and the axis of ordinates presents the load transmitted to the crash can in the collision. As apparent from FIG. 8, at the crushing-start time $t_o$ of the crash can 5, the load of the present embodiment's sample of h/H=0 (see the solid line X) is greater, by ΔL, than that of the comparative sample of h/H=1 (see the imaginary line Y), which shows that the present embodiment's sample has the superior impact load transmission.

In the case in which the distance h of the step potions 18, 19 from the closing plate 11 is configured such that the distance h at the central portion, in the vehicle width direction, of the bumper reinforcement 6 is the maximum and the distance h decreases gradually toward the outward direction of the vehicle, the bending strength at the portion away from the central portion decreases (see FIGS. 5 and 6). However, this decrease may not cause any problem, and the reason for this will be described referring to FIG. 9.

Figure 9:
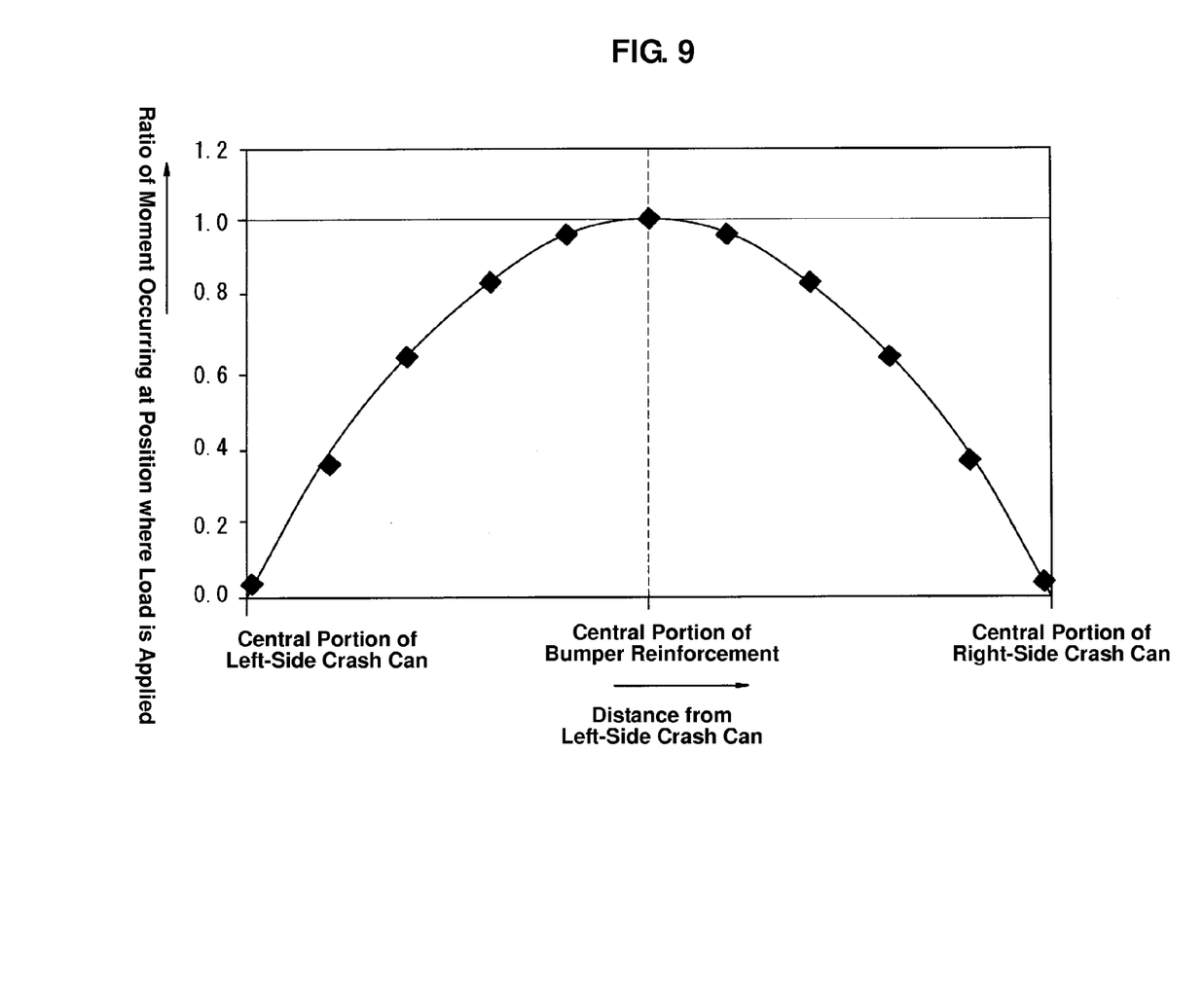
FIG. 9 is a bending-moment distribution diagram showing a ratio of a moment occurring for a position where a load is applied.

FIG. 9 is a bending-moment distribution diagram having the axis of abscissas presenting the distance, in the vehicle width direction, from a central portion of the crash can 5 provided on the left side of the vehicle and the axis of ordinates presenting a ratio of a moment occurring at a position where the load was applied, wherein the moment occurring at a central position of the bumper reinforcement 6 was set at "1.0". Herein, the central portion (in the vehicle width direction) of the left-side crash can 5 and the central portion (in the vehicle width direction) of the right-side crash can 5 are left-and-right support points of the bumper reinforcement 6, and the center of the bumper reinforcement 6 is located at a position which is the furthest away from these support points. Accordingly, on the axis of abscissas of FIG. 9, a position being further away from the center of the bumper reinforcement mean the one more approaching the left-and-right support points.

In a case in which the load was applied to the center of the bumper reinforcement, the bending moment occurring at the bumper reinforcement 6 became the maximum as shown by the curve of FIG. 9. By setting the strength distribution, in the vehicle width direction, of the bumper reinforcement 6 similarly to the curve of FIG. 9, that is—by configuring such that the position having the ratio h/H=0.4 with the maximum bending strength is located at the central portion in the vehicle width direction and the both-side positions gradually approach the ratio h/H=0.0, the resistant load of the bumper reinforcement 6 becomes substantially constant, so that a substantially-constant reaction force can be generated. Accordingly, even if the structure in which the distance, in the vehicle longitudinal direction, of the step potions 18, 19 from the closing plate 11 was configured such that the distance h at the central portion, in the vehicle width direction, of the bumper reinforcement 6 was the maximum and the distance h decreased gradually toward the outward direction of the vehicle was adopted and consequently the bending strength at the positions further away from the center of the bumper reinforcement became smaller, there could be no problem substantially.

As described above, the vehicle-body structure of a vehicle of the present embodiment is equipped with the bumper reinforcement 6, the bumper reinforcement 6 comprising the panel member having the U-shaped cross section (see the bumper beam 10), this panel member including the upper face portion 13 and the lower face portion 14, the vertical wall portion 15, and the flange portions 16, 17, and the panel member formed substantially in the flat-plate shape (see the closing plate 11), this panel member being arranged on the opposite side to the vehicle compartment relative to the above-described panel member and joined to the above-described panel member so as to form the closed cross section 12 extending in the vehicle width direction together with the above-described panel member, wherein the above-described panel member having the U-shaped cross section (see the bumper beam 10) includes the step portions 18, 19 at the upper face portion 13 and the lower face portion 14, and the distance h, in the vehicle longitudinal direction, of the step potions 18, 19 from the panel member formed substantially in the flat-plate shape (see the closing plate 11) is configured such that the distance h at the central portion, in the vehicle width direction, of the bumper reinforcement 6 is the maximum and the distance h decreases gradually toward the outward direction of the vehicle (see FIGS. 3 and 4A, 4B).

According to the present embodiment, since the distance h, in the vehicle longitudinal direction, of the step potions 18, 19 from the panel member formed substantially in the flat-plate shape (see the closing plate 11) is configured such that the distance h at the central portion, in the vehicle width direction, of the bumper reinforcement 6 is the maximum and the distance h decreases gradually toward the outward direction of the vehicle, the bending strength of the step portions 18, 19 at the central portion, in the vehicle width direction, of the bumper reinforcement 6 where a bending load occurring in a light collision is the maximum can be made the maximum, whereas the structure of the step portions 18, 19 at both-side portions of the bumper reinforcement 6 where the above-described bending load is smaller can be made lighter. Accordingly, the bending strength can be ensured and also the light weight of the bumper reinforcement 6 can be attained. Additionally, the load transmission from the bumper reinforcement 6 to the crash can 5 can be improved.

Herein, in a case in which the vehicle-body structure of a vehicle of the present embodiment is applied to the front side of the vehicle, the bending strength can be improved with its lighter weight, so that the cooling unit 8 can be prevented from being broken in the light collision. Further, the length H, in the vehicle longitudinal direction, of the cross section of the bumper reinforcement 6 and the distance h of the step potions 18, 19 from the panel member formed substantially in the flat-plate shape (see the closing plate 11) at the central portion of the bumper reinforcement 6 are configured such that the ratio h/H of the distance h to the length H is 0.2~0.5 (see FIGS. 5 and 6).

Thereby, the bending strength can be further increased. Herein, in a case in which the value of the ratio h/H is smaller than 0.2, the weight becomes light but the bending strength decreases. Meanwhile, in a case in which the value of the ratio h/H is greater than 0.5, the weight becomes heavy and also the bending strength decreases. Therefore, by setting the value of the ratio h/H in the range of 0.2~0.5 (preferably, in the range of 0.3~0.45), the bending strength can be further increased, attaining the light weight of the bumper reinforcement. Moreover, the upper face portion 13 includes the upper face portion 13A located further away from the vertical wall portion 15 and the upper face portion 13B located closer to the vertical wall portion 15, the lower face portion 14 includes the lower face portion 14A located further away from the vertical wall portion 15 and the lower face portion 14B located closer to the vertical wall portion 15, and the angle $\theta 2$ of the upper and lower face portions 13B, 14B relative to the horizontal direction HOR is configured to be greater (larger) than the angle $\theta 1$ of the upper and lower face portions 13A, 14A relative to the horizontal direction HOR (see FIGS. 4A, 4B). Herein, the above-described angles $\theta 1$, $\theta 2$ of the upper face portions 13A, 13B relative to the horizontal direction HOR mean an angle of depression respectively, and the above-described angles $\theta 1$, $\theta 2$ of the lower face portions 14A, 14B mean an angle of ascent, respectively.

According to this structure, since the angle $\theta 1$ of the upper and lower face portions 13A, 14A relative to the horizontal direction HOR is relatively small, buckling of the panel member (see the closing plate 11) formed substantially in the flat-plate shape can be prevented properly. Further, since the angle $\theta 2$ of the upper and lower face portions 13B, 14B relative to the horizontal direction HOR is relatively great (large), in a case in which the panel member having the U-shaped cross section (the bumper beam 10) is formed through pressing by means of a metal mold, an angle of a corner of the metal mold which is located at the back of the metal mold can be designed to be greater (larger), so that the friction against the metal mold can be reduced properly. Consequently, the metal mold can be restrained from being worn away. Herein, it is preferable that the angle $\theta 1$ of the upper and lower face portions 13A, 14A relative to the horizontal direction HOR be 0~15° and the angle $\theta 2$ of the upper and lower face portions 13B, 14B relative to the horizontal direction HOR be 5° or greater (larger). Additionally, the flange extension portions 20, 21 which extend toward the vehicle compartment are formed at the respective end portions of the flange portions 16, 17 (see FIGS. 4A, 4B).

Thereby, since substantially the U-shaped portion is formed at the position from the above-described step portions 18, 19 to the flange extension portions 20, 21, the bending strength against the collision load can be further improved.

Additionally, since no step portion is formed at the both-side end portions of the bumper reinforcement 6 where the crash cans 5 are provided, some sufficient space for welding can be ensured there.

The first panel member having a U-shaped cross section in claims of the present invention corresponds to the bumper beam 10 of the embodiment. Likewise, the second panel member formed substantially in a flat-plate shape corresponds to the closing plate 11, the first and second upper face portions correspond to the upper face portions 13A, 13B respectively, the first and second lower face portions correspond to the lower face portions 14A, 14B respectively, and the first and second angles correspond to the angles $\theta 1$, $\theta 2$ respectively.

The present invention should not be limited to the above-described embodiment, and any other modifications or improvements may be applied within the scope of a sprit of the present invention. For example, while the above-described embodiment shows the case in which the vehicle-body structure of a vehicle according to the present invention is applied to the front side of the vehicle, the vehicle-body structure of a vehicle according to the present invention may be applied to a rear side of the vehicle.

What is claimed is:

1. A vehicle-body structure of a vehicle, comprising:
a pair of front side frames extending in a vehicle longitudinal direction and provided at both sides of the vehicle;
a pair of crash cans provided at front end portions of the front side frames; and
a bumper reinforcement provided to extend in a vehicle width direction between front end portions of the pair of crash cans such that a bending load is applied to the bumper reinforcement supported by the pair of crash cans at both side ends thereof in a vehicle collision,
wherein said bumper reinforcement comprises:
a first panel member having a U-shaped cross section, the first panel member including an upper face portion and a lower face portion, a vertical wall portion, and flange portions, the upper and lower face portions being respectively configured to continuously extend flatly in the vehicle width direction over an entire width, in the vehicle width direction, of the bumper reinforcement; and a second panel member formed substantially in a flat-plate shape, the second panel member being arranged on a vehicle forward side which is opposite side to a vehicle compartment relative to the first panel member and joined to the flange portions of the first panel member so as to form a closed cross section extending in the vehicle width direction together with the first panel member, wherein said first panel member includes step portions respectively formed at the upper face portion and the lower face portion, the step portion formed at the upper face portion being configured to slant rearward and downward in a side view and continuously extend flatly in the vehicle width direction, the step portion formed at the lower face portion being configured to slant rearward and upward in the side view and continuously extend flatly in the vehicle width direction, and a distance, in the vehicle longitudinal direction, of the step potions of the first panel member from said second panel member is configured such that the distance at a central portion, in the vehicle width direction, of the bumper reinforcement is the maximum and the distance decreases gradually continuously toward an outward direction of the vehicle.

2. The vehicle-body structure of a vehicle of claim 1, wherein a length (H), in the vehicle longitudinal direction, of the cross section of the bumper reinforcement and said distance (h) of the step potions of the first panel member from the second panel member at the central portion of the bumper reinforcement are configured such that a ratio (h/H) of the distance (h) to the length (H) is 0.2~0.5.

3. The vehicle-body structure of a vehicle of claim 2, wherein said upper face portion of the first panel member includes a first upper face portion which is located further away from said vertical wall portion and a second upper face portion which is located closer to said vertical wall portion, said lower face portion of the first panel member includes a first lower face portion which is located further away from said vertical wall portion and a second lower face portion which is located closer to said vertical wall portion, and a second angle of said second upper and lower face portions relative to a horizontal direction is configured to be greater than a first angle of said first upper and lower face portions relative to the horizontal direction.

4. The vehicle-body structure of a vehicle of claim 3, wherein flange extension portions which extend toward the vehicle compartment are formed at respective end portions of said flange portions.

5. The vehicle-body structure of a vehicle of claim 2, wherein flange extension portions which extend toward the vehicle compartment are formed at respective end portions of said flange portions.

6. The vehicle-body structure of a vehicle of claim 1, wherein said upper face portion of the first panel member includes a first upper face portion which is located further away from said vertical wall portion and a second upper face portion which is located closer to said vertical wall portion, said lower face portion of the first panel member includes a first lower face portion which is located further away from said vertical wall portion and a second lower face portion which is located closer to said vertical wall portion, and a second angle of said second upper and lower face portions relative to a horizontal direction is configured to be greater than a first angle of said first upper and lower face portions relative to the horizontal direction.

7. The vehicle-body structure of a vehicle of claim 6, wherein flange extension portions which extend toward the vehicle compartment are formed at respective end portions of said flange portions.

8. The vehicle-body structure of a vehicle of claim 1, wherein flange extension portions which extend toward the vehicle compartment are formed at respective end portions of said flange portions.

9. The vehicle-body structure of a vehicle of claim 1, wherein no step portion is formed at both-side end portions of said upper and lower face portions of the first panel member of the bumper reinforcement where the crash cans are provided.

* * * * *